United States Patent
Saloni et al.

(10) Patent No.: US 12,081,986 B2
(45) Date of Patent: Sep. 3, 2024

(54) HANDLING UNSOLICITED PROBE RESPONSES

(71) Applicant: Hewlett Packard Enterprise Development LP, Houston, TX (US)

(72) Inventors: Shubham Saloni, San Jose, CA (US); Abhiruchi Dakshinkar, San Jose, CA (US); Wei Hu, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 388 days.

(21) Appl. No.: 17/680,557

(22) Filed: Feb. 25, 2022

(65) Prior Publication Data

US 2023/0276239 A1   Aug. 31, 2023

(51) Int. Cl.
*H04W 12/122* (2021.01)
*H04W 48/16* (2009.01)
*H04W 76/10* (2018.01)
*H04W 84/12* (2009.01)

(52) U.S. Cl.
CPC ......... *H04W 12/122* (2021.01); *H04W 48/16* (2013.01); *H04W 76/10* (2018.02); *H04W 84/12* (2013.01)

(58) Field of Classification Search
CPC ..... H04L 61/5092; H04L 43/12; H04L 63/20; H04W 12/122; H04W 48/16; H04W 76/10; H04W 84/12; H04W 88/08
See application file for complete search history.

(56) References Cited

U.S. PATENT DOCUMENTS

| 8,725,138 B2 | 5/2014 | Lee et al. |
| 10,966,277 B1 | 3/2021 | Shukla |
| 2010/0020746 A1* | 1/2010 | Zaks ....................... H04L 63/20 370/328 |
| 2019/0200278 A1 | 6/2019 | Ouzieli et al. |
| 2019/0268892 A1 | 8/2019 | Gidvani et al. |
| 2020/0120711 A1 | 4/2020 | Sevin et al. |
| 2020/0162915 A1 | 5/2020 | Dhammawat et al. |
| 2021/0067961 A1 | 3/2021 | Dhammawat et al. |
| 2022/0377042 A1* | 11/2022 | Henry ................. H04L 61/5092 |
| 2023/0007516 A1* | 1/2023 | Monajemi ............... H04L 43/12 |

FOREIGN PATENT DOCUMENTS

| WO | 2018/232138 A1 | 12/2018 |
| WO | 2020/050773 A1 | 3/2020 |
| WO | 2021/021016 A1 | 2/2021 |

* cited by examiner

*Primary Examiner* — Vinncelas Louis
(74) *Attorney, Agent, or Firm* — Hewlett Packard Enterprise Patent Department

(57) ABSTRACT

Examples of techniques for handling unsolicited probe responses are disclosed. In an example, occurrence of an attack on an access point (AP) in an enterprise Wireless Local Area Network (WLAN) is detected based on an unsolicited probe response and Robust Security Network Information Element (RSN IE). Responsive to detecting the attack, unsolicited probe responses at the AP is disabled. Further, Fast initial Link Setup (FILS) discovery at the AP is enabled.

17 Claims, 6 Drawing Sheets

HANDLING UNSOLICITED PROBE RESPONSES

BACKGROUND

A computer network includes a variety of network devices, such as access points, controllers, gateways, switches, etc., which perform different networking operations, such as network access, authentication, and routing network traffic to provide connectivity. A Wireless Local Area Network (WLAN) may include a plurality of Wireless Access Points (APs), as elements of the WLAN. These APs may act as points of attachment to a wireless network.

These APs send probe responses and beacons to advertise their location, capabilities, and connection requirements to client devices in the WLAN. The beacons/probe responses may include Service Set Identifiers (SSIDs), Basic Service Set Identifiers (BSSIDs), operating channel information, supported bitrates, Information Elements (IEs) that indicate channel number, security requirements (WEP or WPA, open etc.) of the AP. The AP may send the beacon or probe response at a fixed interval, say 20 milli seconds (ms), 100 ms, etc. An SSID represents a network name advertised by an AP and a BSSID represents a physical address or a Media Access Control (MAC) address of a network interface of the AP which transmits and receives different frames.

BRIEF DESCRIPTION OF DRAWINGS

The present disclosure, in accordance with one or more various embodiments, is described in detail with reference to the following figures. The figures are provided for purposes of illustration only and merely depict typical or example embodiments.

Figure 1:
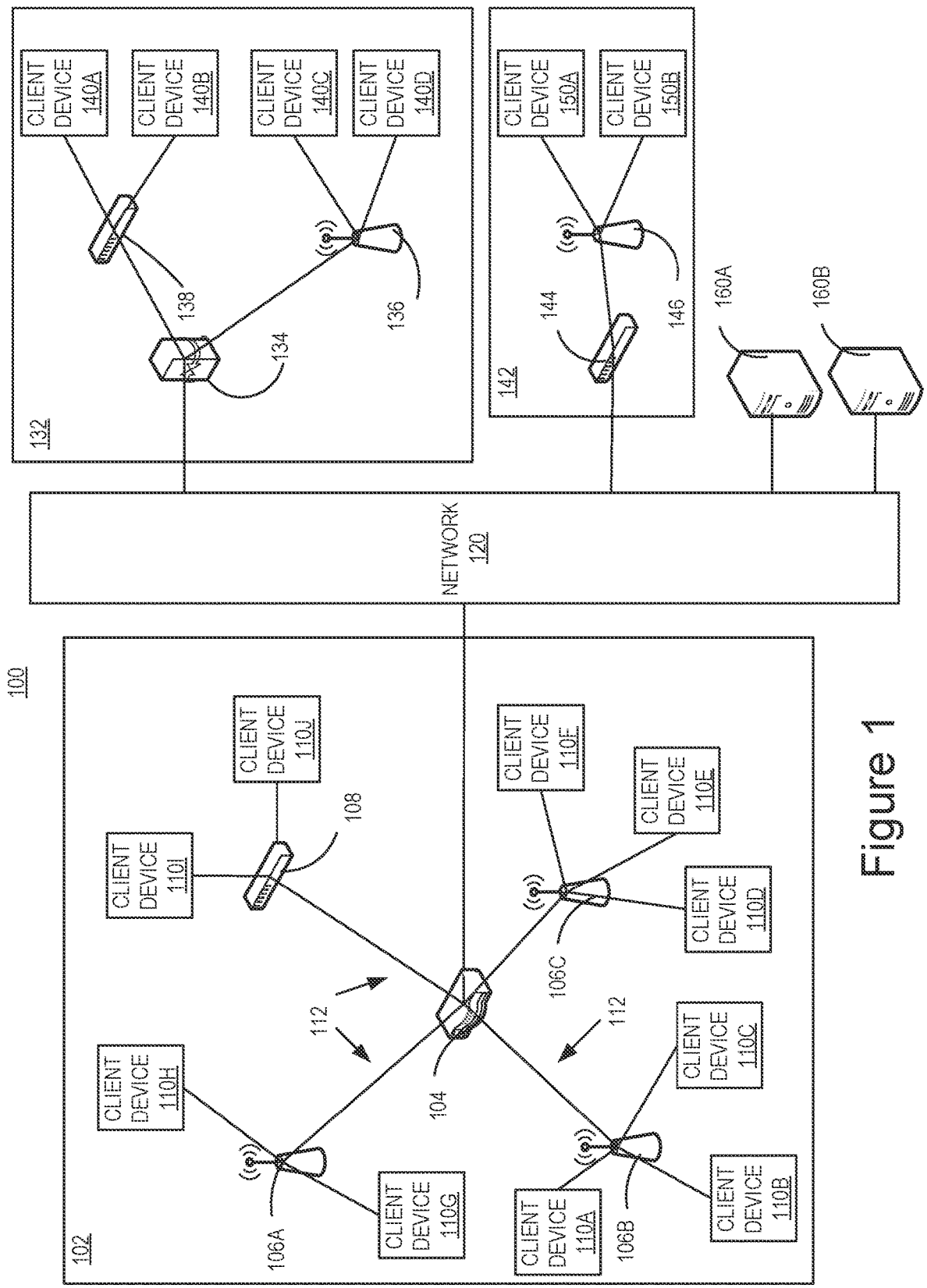
FIG. 1 illustrates an example of a network configuration in which embodiments of the invention may be implemented for an organization, such as a business, educational institution, governmental entity, healthcare facility or other organization.

The figures are not exhaustive and do not limit the present disclosure to the precise form disclosed.

DETAILED DESCRIPTION

Generally, WLAN communications occur over a range of Radio Frequency (RF) bands, where each band is divided into multiple WLAN channels as per the Institute of Electrical and Electronics Engineers (IEEE) 802.11 standards. The 2.4 GHz, 5 GHz, and 6 GHz bands are quite common for home and enterprise WLAN. AP discovery is a process in which a client device, on powering-up or entering a building, finds a suitable AP to connect to. To perform discovery, client devices may "actively" scan WLAN channels in turn by transmitting one or more probe requests, listening for probe responses from APs in range, examining the probe responses to see if any of the SSIDs match profiles in the client, and then scanning the next channel. This active scanning by the client device may take up significant time in scanning each channel one by one to discover all the APs in a band which may affect application performance while the radio is away from its serving channel. Also, it may require many probe requests and response frames over the air, which reduces airtime efficiency and may also affect client battery life which may be depleted for scanning.

As an alternative to such active scanning, the Wi-Fi 6E standard offers a path to "passive" scanning directly in 6 GHz band. Passive scanning may occur through (a) Fast Initial Link Setup (FILS) discovery and (b) unsolicited probe responses which may allow the AP to broadcast a compact beacon in a fixed interval, such as 20 msecs. The unsolicited probe response is similar to a beacon and may carry Information Elements, such as Reduced Neighbour Report Information Element (RNR IE) and Robust Security Network Information Element (RSN IE) for each AP along with SSID and BSSID. This allows a client device to tune its radio to a particular WLAN channel and wait, knowing that it will hear an advertisement in the form of an unsolicited probe response from the AP within the fixed interval, without actively transmitting probe requests. This reduces frames on the air and extends client battery life, thereby allowing efficient discovery of APs.

However, such unsolicited probe responses are vulnerable to web attacks, including Denial of Service (DoS) attacks. In an example, a DoS attack may be launched by transmitting incorrect RSN IE in an unsolicited probe response. RSN IE refers to a field in probe responses or beacons which carry information regarding authentication methods supported by an AP. In some examples, the RSN IE may include security profile information indicative of a type of encryption that is supported by an AP for authentication with client devices.

An unsolicited probe DoS attack may work as follows. A rogue AP, hidden node, or other attacker may send unsolicited probe responses purporting to provide RSN IE security profile data relating to neighbouring Aps. The RSN IE information the attacker provides is configured incorrectly to advertise a security profile different from that of the AP under attack. When a client device processes the attacker's RSN IE information, it attempts to authenticate to the AP using the mismatched security information. As a result, the client fails to authenticate to the AP and cannot obtain network access. After that, the client may attempt to retry to authentication using the same inaccurate security profile information provided by the attacker. Eventually, the client may give up and de-authenticate from the AP. As a result, the client suffers a service interruption that may be consistent with a successful Denial-of-service (DoS) attack.

The present invention detects such unsolicited probe DoS attacks and initiates measures to mitigate them. In an example, APs may scan for evidence of rogue unsolicited probe responses attacking them. APs that detect such attacks may respond by implementing measures to defeat them. For example, the AP may switch to an alternate form of authentication that is less vulnerable to rogue unsolicited probe response attacks. The AP may disable unsolicited probe responses. This reduces chances of the client trying to establish a connection with the AP using unsolicited probe response security information. Further, the AP may switch to enabling an alternative supported authentication method that is less vulnerable to rogue unsolicited probe response attacks. One example is Fast initial Link Setup (FILS) discovery. FILS discovery methods are defined in the Institute of Electrical and Electronics Engineers (IEEE) 802.11ai standard. Once FILS discovery is enabled, the AP broadcasts a FILS discovery frame at a fixed interval. The FILS discovery frame may include a short SSID and BSSID of the AP. In an example, the short SSID is a condensed format SSID. In an example, the full SSID may have a maximum of thirty-two bytes, where the short SSID may have four bytes. Based on information in the FILS discovery frame, the client may actively send a probe request. The probe request may be directed to a specific AP using the AP's SSID provided in the FILS discovery frame. A "directed" probe request refers to a probe request sent by a client device looking for an AP using the AP's specific SSID or other targeting information. When sending the directed probe request, the client device may set the SSID field of the probe request frame to the specific SSID. The client then receives probe responses that it has solicited using directed probe requests. This authentication system further diminishes the possibility of the client processing an unsolicited probe response from an attacker. As a result, rogue unsolicited probe response attack effectiveness is mitigated.

In an example, methods and systems of the present subject matter include detecting, based on an unsolicited probe response and RSN IE, occurrence of an attack on an AP in an enterprise WLAN. They may also include disabling unsolicited probe responses at the AP in response to detecting the attack. They may further include enabling FILS discovery at the attacked AP.

The following detailed description refers to the accompanying drawings. Wherever possible, the same reference numbers are used in the drawings and the following description to refer to the same or similar parts. While several embodiments of the present invention are described herein, modifications, adaptations, and other implementations of those embodiments are possible. Accordingly, the following detailed description does not limit the scope of the present invention. Instead, the proper scope of the present invention is defined by the appended claims.

Before describing embodiments of the systems and methods of the present invention in detail, it is useful to describe an example network installation in which these systems and methods might be implemented in various applications. FIG. 1 illustrates one example of a network configuration 100 in which an embodiment of the present invention may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network such as an office, campus, home, or other network installation. The primary site 102 network may be a private network, such as a network that may include security and access controls to restrict access to authorized users of the private network. Authorized users may include, for example, authorized employees, residents, university students, customers, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

The controller 104, also called a WLAN controller, may be operable to configure and manage primary and/or remote network devices. The controller 104 may be operable to configure and/or manage switches, routers, access points, and/or client devices connected to a network. The controller 104 may itself be, or provide the functionality of, an access point. In some examples, the controller 104 may act as a central repository for storing primary and/or secondary site AP configuration information. "Configuration information" refers to information relating to location and capabilities of APs in the network. The configuration information may include neighbour reports, RSN IE, capabilities information, etc., of the APs in network 100.

The controller 104 may be in communication with one or more switches 108 and/or wireless APs 106a-c. Switches 108 and APs 106a-c provide network connectivity to various client devices 110a-j. Using a connection to a switch 108 or AP 106a-c, a client device 110a-j may access network resources, including other devices on the primary site 102 network and the network 120. Examples of client devices may include desktop computers, laptop computers, tablet computers, e-readers, netbook computers, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

APs 106a-c are included as another example of a point of access to the network established in primary site 102 for wireless client devices 110a-h. The APs 106a-c may control network access of the client devices 110a-h and may authenticate the client devices 110a-h for connecting to the APs and through the APs, to other devices within the network configuration 100. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, a conference room, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150A-B access the network 120. Such a remote site 142 may represent, for example, an individual employee's home or a temporary remote office. The remote site 142 may also be in communication with the primary site 102, such that the client devices 150A-B at remote site 142 access network resources at the primary site 102 as if these client devices 150A-B were located at the primary site 102. The remote site 142 may be managed by the controller 104 at the primary site 102 to make this transparency possible. Once connected to the primary site 102, the remote site 142 may function as a part of a private network provided by the primary site 102. Further, the client devices 110A-J, 140A-D, 150A-B may request and access the services provided by the wired host devices 114 and 148A-B.

The network 120 may be a public or private network, such as the Internet, or other communication network to allow connectivity among the various sites 102, 130 to 142 as well as access to servers 160A-B. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160A-B. Content servers 160A-B may include various providers of multimedia downloadable and/or streaming content, including audio, video, graphical, and/or text content, or any combination thereof. Examples of content servers 160A-B include, for example, web servers, streaming radio and video providers, and cable and satellite television providers. The client devices 110A-J, 140A-D, 150A-B may request and access the multimedia content provided by the content servers 160A-B.

Figure 2:
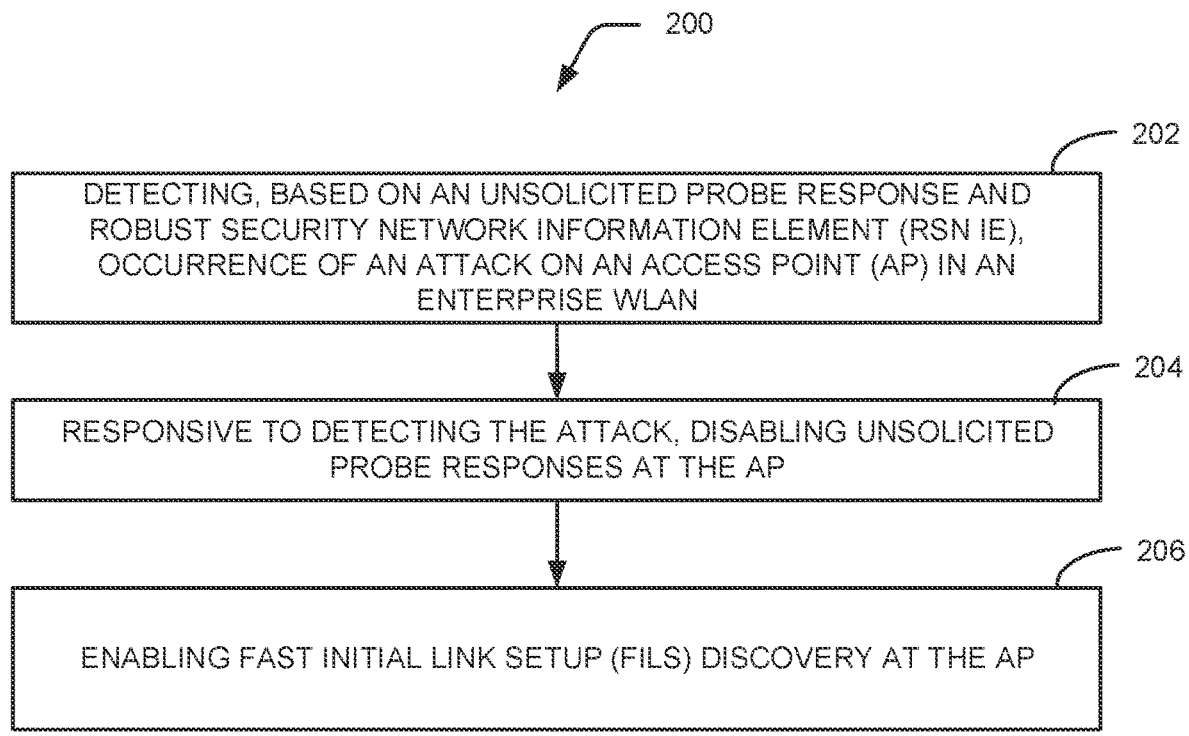
FIG. 2 illustrates an example method for handling unsolicited probe responses, in accordance with an embodiment of the present invention.

FIG. 2 illustrates an example method 200 for handling unsolicited probe responses, in accordance with an embodiment of the present invention. The method 200 may be executed by an access point, such as an access point 106a of FIG. 1. The method 200 can be implemented by processing resource(s) or computing device(s), through any suitable hardware, a non-transitory machine readable medium, or combination thereof. In an example, the method 200 may be performed by computer-readable instructions, which include instructions stored on a medium and executable by a processing resource, such as a hardware processor, of a computing device/component. It may be understood that processes involved in the method 200 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 2, at step 202, an AP under attack may detect occurrence of an attack based on an unsolicited probe response and Robust Security Network Information Element (RSN IE). The attack may be a web-based attack where an attacker may exploit vulnerabilities to copy and modify the RSN IE. In an example, the AP under attack may receive an unsolicited probe response sent by another AP which may be a malicious AP or hidden node executing an attack. The AP then checks the transmitter address included in the unsolicited probe response. The AP may determine that a transmitter address in the unsolicited probe response is identical to its own transmitter address. This suggests that an attacker is imitating or spoofing the AP's genuine unsolicited probe responses. Further, the AP may detect a mismatch between its correct RSN IE parameters and RSN IE parameters in the suspect unsolicited probe response. This would further confirm the presence of a malicious attack. In an example, the RSN IE in a beacon broadcast by the genuine AP may advertise a security profile such as "Auth Key Management (AKM) Suite: 00:0f:ac (Ieee 802.11) Opportunistic Wireless Encryption (OWE)". This may convey to the client devices receiving such beacon that the AP supports OWE for secure authentication. However, an attacker, using the same AP transmitter address as that of the genuine AP under attack, may send an unsolicited probe response advertising a different security profile, such as "Auth Key Management (AKM) Suite: 00:0f:ac (Ieee 802.11) Simultaneous Authentication of Equals (SAE) (SHA 256)". On processing this unsolicited probe response from the attacker, a client device may erroneously determine that the genuine AP is configured to support SAE encryption based on Secure Hash Algorithm (SHA) 256. Thus, the client device may be confused as to what is the actual security profile supported by the AP. If the client device attempted to authenticate based on SAE, it would fail. The SAE security profile would not match the OWE security profile in use in the genuine AP. The AP may identify an attack by detecting such a mismatch. In some examples, an AP in a WLAN may also detect the attack in a neighbour AP in the network using similar methods. Details regarding detection of the attack in a neighbour AP are discussed later in the description.

At block 204, responsive to detecting the attack, the attacked AP may stop sending unsolicited probe responses. In an example, the AP may modify its configuration parameters to disable unsolicited probe responses. With unsolicited probe responses disabled, the AP may be discovered by other scanning techniques, including active probing techniques such as Preferred Scanning Channels (PSCs) or FILS discovery techniques.

At block 206, the AP enables, for example, FILS discovery. Once FILS discovery is enabled, the AP may broadcast a FILS discovery frame to the clients in its range. FILS discovery frames act as mini beacons, transmitted at fixed intervals, such as 20 msecs. FILS discovery methods are defined in IEEE 802.11ai standard. Briefly, each FILS discovery frame contains the information necessary for a client device to decide whether the AP is suitable for connection, including an SSID. Thus, based on the FILS discovery frame, if the client device decides that the AP is suitable for connection, the client device may send a probe request directed to the AP using its FILS discovery frame SSID. The AP may respond to the directed probe request with a solicited probe response and share detailed capability information. This enables the AP to establish a connection with the client device. The client device may then process the solicited probe response from the AP based on security, capabilities, and channel information and proceed with authentication and handover, thereby finish establishing a connection with the AP. Thus, disabling the unsolicited probe responses and using FILS discovery frames for AP discovery may reduce the chances of DoS attacks that uses the unsolicited probe responses.

Figure 3:
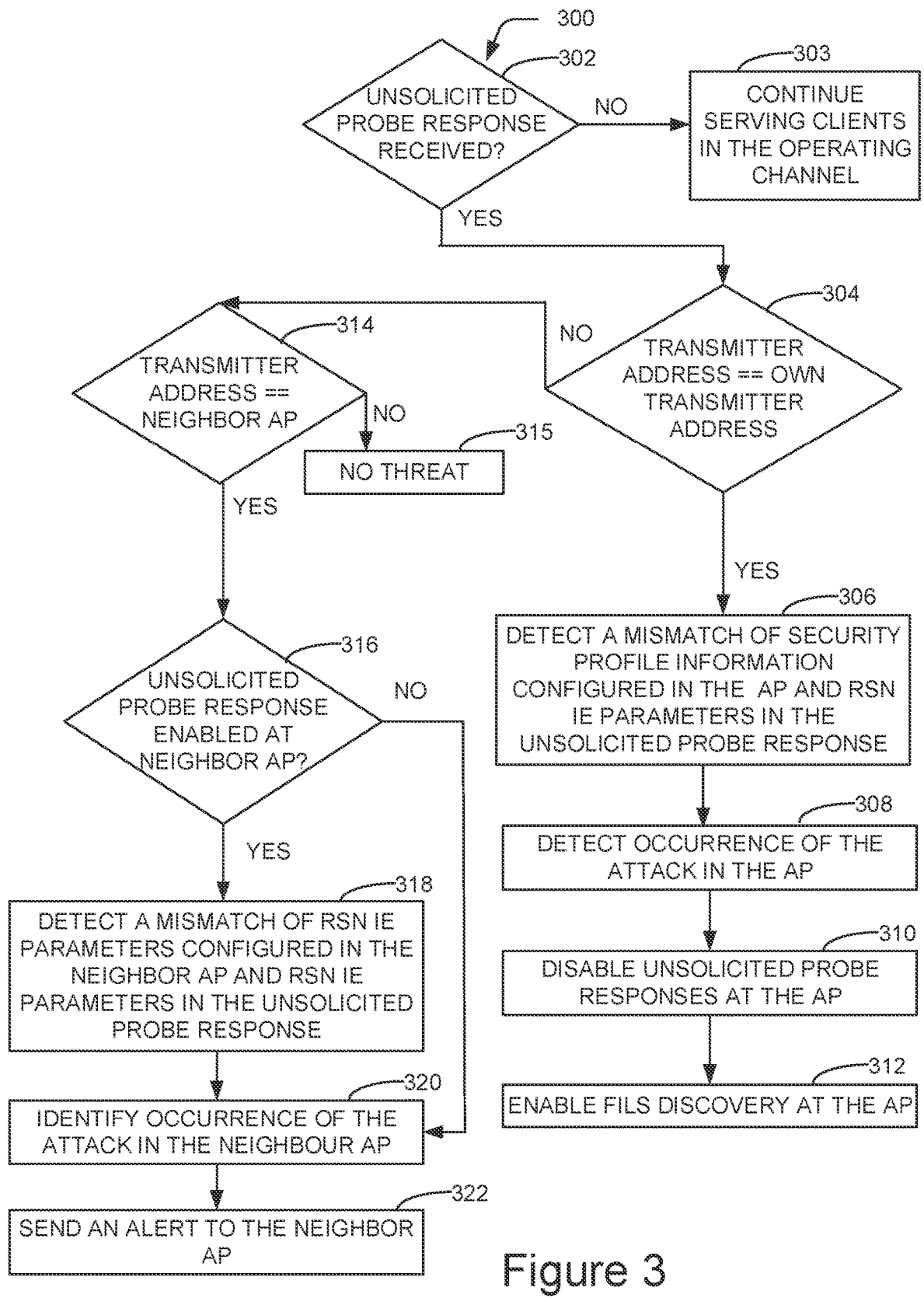
FIG. 3 illustrates an example method for handling unsolicited probe responses, in accordance with an embodiment of the present invention.

FIG. 3 illustrates an example method 300 for handling unsolicited probe responses, in accordance with an embodiment of the present invention. The method 300 may be executed by an access point (AP), such as an access point 106a of FIG. 1. The method 300 can be implemented by processing resource(s) or computing device(s) through any suitable hardware, a non-transitory machine readable medium, or combination thereof. In an example, the method 300 may be performed by computer-readable instructions, which include instructions stored on a medium and executable by a processing resource, such as a hardware processor, of the AP.

In an example, in a multi-BSS scenario multiple Virtual Access Points (VAPs) may be implemented within a single physical AP and steps of the method 300 may be performed by each of the VAPs. A VAP includes a multiplexed installation of a single physical AP so that it presents itself as multiple discrete APs to WLAN clients. Each VAP broadcasts its own SSID and has its own network interface with a BSSID. Each of the VAPs in such an enterprise WLAN may obtain configuration information of other VAPs from a central database maintained by one of the APs which may also act as a WLAN controller, such as controller 104. The configuration information may include SSIDs, BSSIDs, RSN IE, Reduced Neighbour Report IE, and serving channel information of other VAPs in the network. In a distributed WLAN, the VAPs may access a central database stored in a cloud server to obtain the configuration information of other VAPs in the enterprise network.

Consider an enterprise WLAN where there are 4 APs, viz., AP1, AP2, AP3, and AP4 operating in 6 GHz band. Consider that unsolicited probe response is enabled for all the APs. Referring to FIG. 3, at step 302, AP1 may check whether an unsolicited probe response is received by it. If no unsolicited probe response is received by AP1, it may continue to serve other clients associated with it in its operating channel, at step 303. In response to receiving an unsolicited probe response, at step 304, AP1 may compare the transmitter address of the unsolicited probe response with a transmitter address of its own network interface. In an example, the transmitter address may belong to a network interface of a VAP in AP1. If the transmitter address of the unsolicited probe response matches with the transmitter address of AP1 ("Yes" branch from step 304), AP1 may compare the RSN IE parameters in the unsolicited probe response with its security profile information. Based on the comparison, AP1 may detect a mismatch of security profile information in the AP and RSN IE parameters in the unsolicited probe response at step 306. In response detection of the mismatch, at block 308, AP1 may identify that it is under attack.

On detecting that it is under attack, the AP1 disables unsolicited probe responses at step 310 and enables FILS discovery at step 312. Further steps to mitigate the attack may also be carried out at the client device as described in connection with FIG. 5 hereinafter.

In another example, the attack may be directed to another AP, such as AP2, AP3, or AP4 in the enterprise WLAN. At step 304, if the transmitter address of the unsolicited probe response does not match with the transmitter address of AP1 ("No" branch from step 304), at step 314, AP1 may compare the transmitter address of the unsolicited probe response with the transmitter address of each of AP2, AP3, and AP4 in the enterprise WLAN. The transmitter addresses of AP2, AP3, AP4 may be stored in a central database maintained by a WLAN controller or in a cloud server. In an example the central database may include a table with SSIDs, transmitter addresses, and security profile information corresponding to each of the APs. An example table 1 is shown below.

TABLE 1

|  | SSID | Transmitter Address | Security profile information | Unsolicited probe response enabled | FILS enabled |
| --- | --- | --- | --- | --- | --- |
| AP1 | 6e_home | 68:1b:10 | OWE | Yes | No |
| AP2 | 6e_conference | 68:1b:11 | SAE | Yes | No |
| AP3 | 6e_office | 68:1b:12 | AES | No | Yes |
| AP4 | 6e_guest | 68:1b:13 | OWE | No | Yes |

As shown in table 1, for each of the AP1 to AP4 operating in the 6 GHz band, either one of unsolicited probe response or FILS discovery is enabled. At step 314, if the AP1 determines that the transmitter address of the unsolicited probe response is 68:1b:11, which is also the transmitter address for AP2, AP1 determines that the unsolicited probe response is associated with its neighbour AP. i.e., AP2. If the transmitter address of the unsolicited probe response does not match with the transmitter address of AP2, AP1 then compares the transmitter address of the unsolicited probe response with AP3 and AP4 to look for a match. If the transmitter address does not match any of the neighbour AP addresses, then, at step 315, AP1 determines that there is no threat to any of the APs in the enterprise WLAN. If the transmitter address of the unsolicited probe response matches to that of AP2 for example, AP1 then checks the AP2 configuration information stored in the central database. Based on the configuration information, at step 316, AP1 may also check whether unsolicited probe response is enabled at the neighbour AP, i.e., AP2 in this case.

If unsolicited probe response is enabled at AP2 ("Yes" branch from step 316), AP1 may compare the security profile information of AP2 as stored in the central database with RSN IE parameters included in the unsolicited probe response. For example, the AP2 security profile information may be SAE. Thus, if the RSN IE of the unsolicited probe response has any encryption method other than SAE for authentication, then AP1 may detect a mismatch of security profile information in the neighbour AP (AP2) and RSN IE parameters in the unsolicited probe response, at step 318. In response to detection of the mismatch, AP1 identifies occurrence of an attack on AP2, at step 320. In another example, in response to detecting that unsolicited probe responses are disabled at AP2 ("No" branch from step 316), AP1 may identify occurrence of an attack on AP2 at block 320. Receiving an unsolicited probe response from the transmitted address of AP2, even with unsolicited probe response disabled at AP2, indicates that the unsolicited probe response may have originated from an untrusted source, such as a rogue AP or a hidden node.

On identification of occurrence of an attack, AP1 may send an alert to the neighbour AP, i.e., AP2 indicating that AP2 is under attack, at step 322. In some examples, in response to receiving the alert, AP2 may perform the steps 310 and 312 to mitigate the attack. In another example, AP1 may broadcast a notification to devices in the enterprise WLAN informing that AP2 is under attack. Although the method 300 is described with reference to APs operating only in the 6 GHz band, the method 300 may be performed by individual VAPs in a co-located 2.4/5/6 GHz AP.

Figure 4:
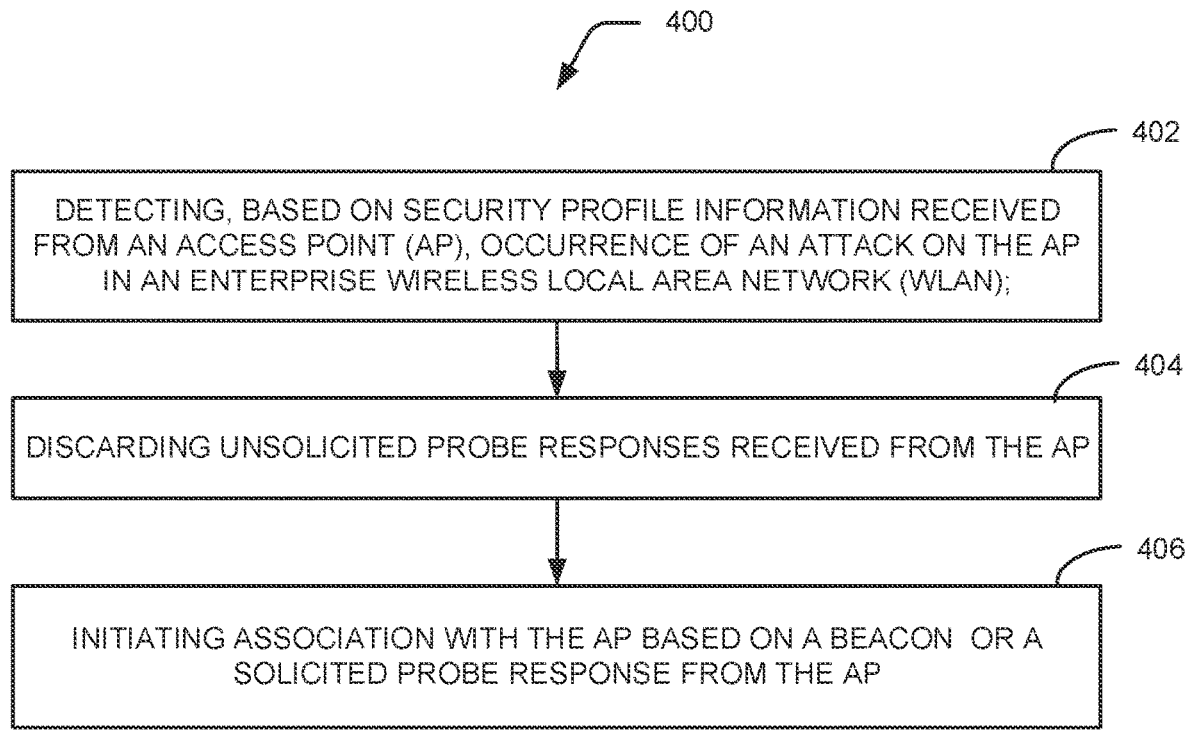
FIG. 4 illustrates an example method for handling unsolicited probe responses, in accordance with an embodiment of the present invention.

FIG. 4 illustrates an example method 400 for handling unsolicited probe responses, in accordance with an embodiment of the present invention. The method 400 may be executed by a client device, such as a client device 110*a* to 110*j* of FIG. 1. The method 400 can be implemented by processing resource(s) or computing device(s) through any suitable hardware, a non-transitory machine readable medium, or combination thereof. In an example, the method 400 may be performed by computer-readable instructions, which include instructions stored on a medium and executable by a processing resource, such as a hardware processor, of the client device.

For example, a client device may attempt to authenticate with an AP operating in 6 GHz band in an enterprise WLAN. The AP may be configured to broadcast unsolicited probe responses every 20 msecs. In an example, the client device that intends to associate with one of APs in the enterprise WLAN may tune its radio to 6 GHz and wait for unsolicited probe responses or FILS discovery frames from APs within its range. In response to receiving an unsolicited probe response, the client device may send an authentication request to an AP from which the unsolicited probe response originated.

If the authentication request fails, the client device may send another authentication request to the AP. If there are multiple failures in authentication, the client device may flag a failure event indicating an occurrence of multiple failed connection attempts with the AP. In response to flagging of the failure event, the client device may check the RSN IE in a plurality of unsolicited probe responses received from the AP. In an example, the client device may check the RSN IE in the plurality of unsolicited probe responses received over the past 100 msecs. At block 402, in response to detecting discrepancies in the RSN IE among the plurality of unsolicited probe responses, the client device identifies that the AP is under attack. In an example, the discrepancies may include alterations in security profile information mentioned in the RSN IEs. In another example, the client device may also identify an attack in response to receiving both FILS discovery frames and unsolicited probe responses from the AP over a predefined interval. Since, as per IEEE 802.11 standards, devices operating in 6 GHz are configured to broadcast either unsolicited probe response or FILS discovery frames, but not both, if the client device receives both unsolicited probe response and FILS discovery frames from an AP for a predefined duration such as 100 msecs, then the client device may determine that the unsolicited probe response may have originated from an untrusted source, such as an attacker.

In an example, before processing an unsolicited probe response, the client device may validate security profile information of the AP obtained from the unsolicited probe response against security profile information in a beacon or solicited probe response from the AP. Upon successful validation, i.e., in response to a match in the security profile information in the unsolicited probe response and that in the beacon or solicited probe response, the client device may add SSID of the AP in a list of available networks. The user may choose to connect to the AP from the list of available networks. Thus, the client device may verify information in the unsolicited probe responses and thereby prevent/reduce chances of an attack using them.

In response to detecting the attack, at block 404, the client device may discard unsolicited probe responses received from the AP. In an example, in response to detecting the attack, the client device may not add the SSID of the AP in the list of available networks thereby avoiding connection attempts to that SSID that may be prone to failure. In another example, the client device may store the BSSID of the AP from which the unsolicited probe response is received. If subsequent unsolicited probe responses are received from the same BSSID, the client device may ignore the same for a fixed interval.

At block 406, the client device may initiate association with the AP based on a beacon from the AP or a solicited probe response. In an example, the client device may wait for Target Beacon Transmission Time (TBTT) interval for a beacon frame from the BSSID and initiate association with the AP based on information in the beacon frame. Further, the client device may be configured to initiate association based on FILS discovery frames.

In an example, based on a FILS discovery frame, the client device may send a directed probe request to the AP prior to initiating the association with the AP. Based on the directed probe request, the client device may receive a solicited probe response from the AP using which the client device may send an association request to the AP. Further, in another example, the client device may delete previous connection history associated with the SSID and corresponding security profile information. In an example, the client device may delete security profile information of SSIDs which may stored in its cache memory, so that previously stored security profile information is not used while sending association requests to the AP.

Figure 5:
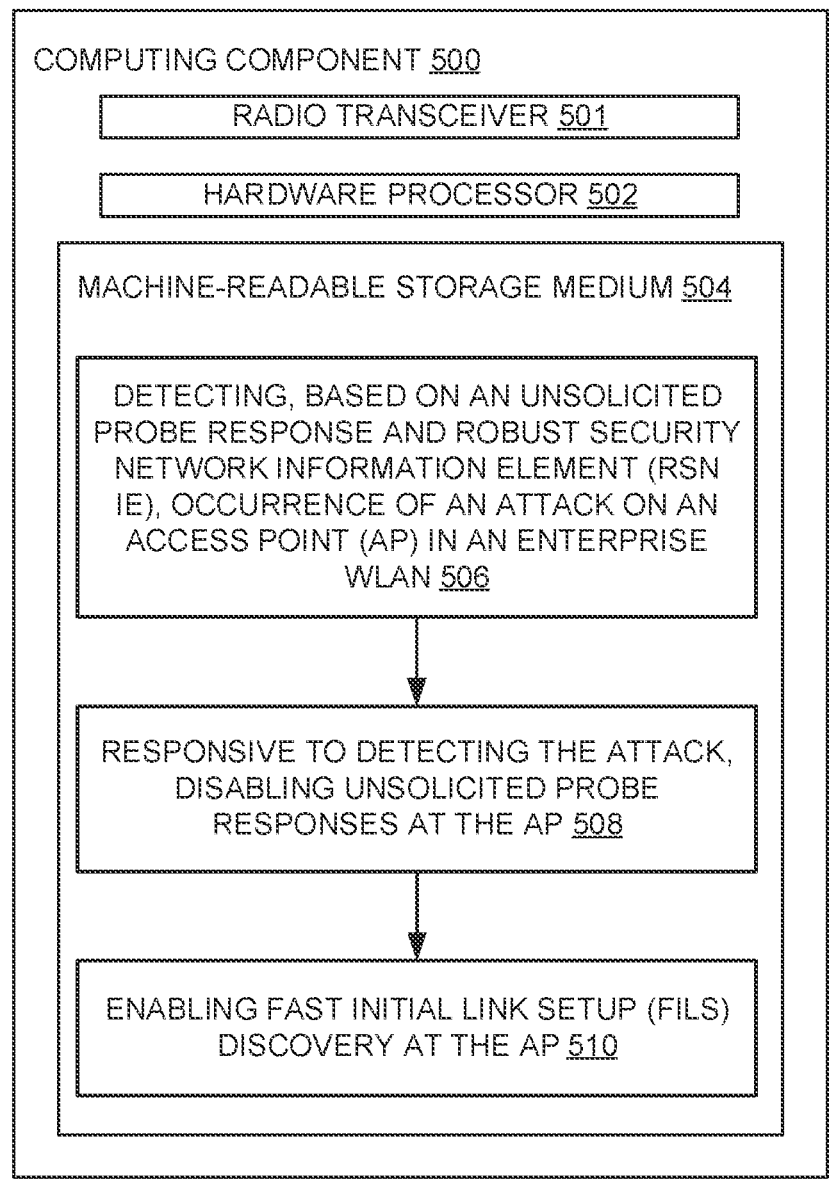
FIG. 5 is a block diagram of an example computing component for handling unsolicited probe responses, in accordance with an embodiment of the present invention.

FIG. 5 is a block diagram of an example computing component 500 for handling unsolicited probe responses, in accordance with an embodiment of the present invention. In an example, the computing component 500 may function as an AP as described above in reference to FIG. 1.

In the example implementation of FIG. 5, the computing component 500 includes a hardware processor 502 and a machine-readable storage medium 504. The hardware processor 502 may be one or more central processing units (CPUs), semiconductor-based microprocessors, and/or other hardware devices suitable for retrieval and execution of instructions stored in the machine-readable storage medium

504. The hardware processor 502 may fetch, decode, and execute instructions, such as instructions, to control processes or operations for handling unsolicited probe responses.

In some embodiments, machine-readable storage medium 404 may be a non-transitory storage medium, where the term "non-transitory" does not encompass transitory propagating signals. As described in detail below, machine-readable storage medium 504 may be encoded with executable instructions for handling unsolicited probe responses.

In the example implementation of FIG. 5, the computing component 500 includes a radio transceiver 501. The radio transceiver 501 acts as a transmitter and receiver for radio frequency (RF) signals. The radio transceiver 501 may be a combination of hardware and software. The radio transceiver 501 may be tuned to 6 GHz radio frequency band for communication as per the IEEE 802.11ax standard. The radio transceiver 501 may be coupled to the hardware processor 502 and machine-readable storage medium 504 via communication links.

At block 506, the hardware processor 502 may execute instructions stored in the machine-readable storage medium 504 to detect, based on an unsolicited probe response and RSN IE, occurrence of an attack on an AP in an enterprise WLAN. In an example, the hardware processor 502 may identify that a transmitter address of the unsolicited probe response is identical to a transmitter address of the AP, detect a mismatch of RSN IE parameters configured in the AP and RSN IE parameters in the unsolicited probe response, and identify occurrence of the attack in the AP, in response detection of the mismatch.

In response to detecting occurrence of the attack, at block 508, the hardware processor 502 may execute instructions stored in the machine-readable storage medium 504 to disable unsolicited probe responses at the AP. Further, at block 510, the hardware processor 502 may execute instructions stored in the machine-readable storage medium 504 to enable FILS discovery at the AP. Disabling unsolicited probe responses and enabling FILS discovery may stop unsolicited probe responses originating from the AP and as a result a client device relies on FILS discovery frames for association with the AP. Using FILS discovery frames, the client device sends a directed probe request to a specific AP. Using the information in a solicited probe response to the directed probe request, the client device may associate with the AP. Hence adverse impact of attacks based on unsolicited probe responses may be mitigated.

Figure 6:
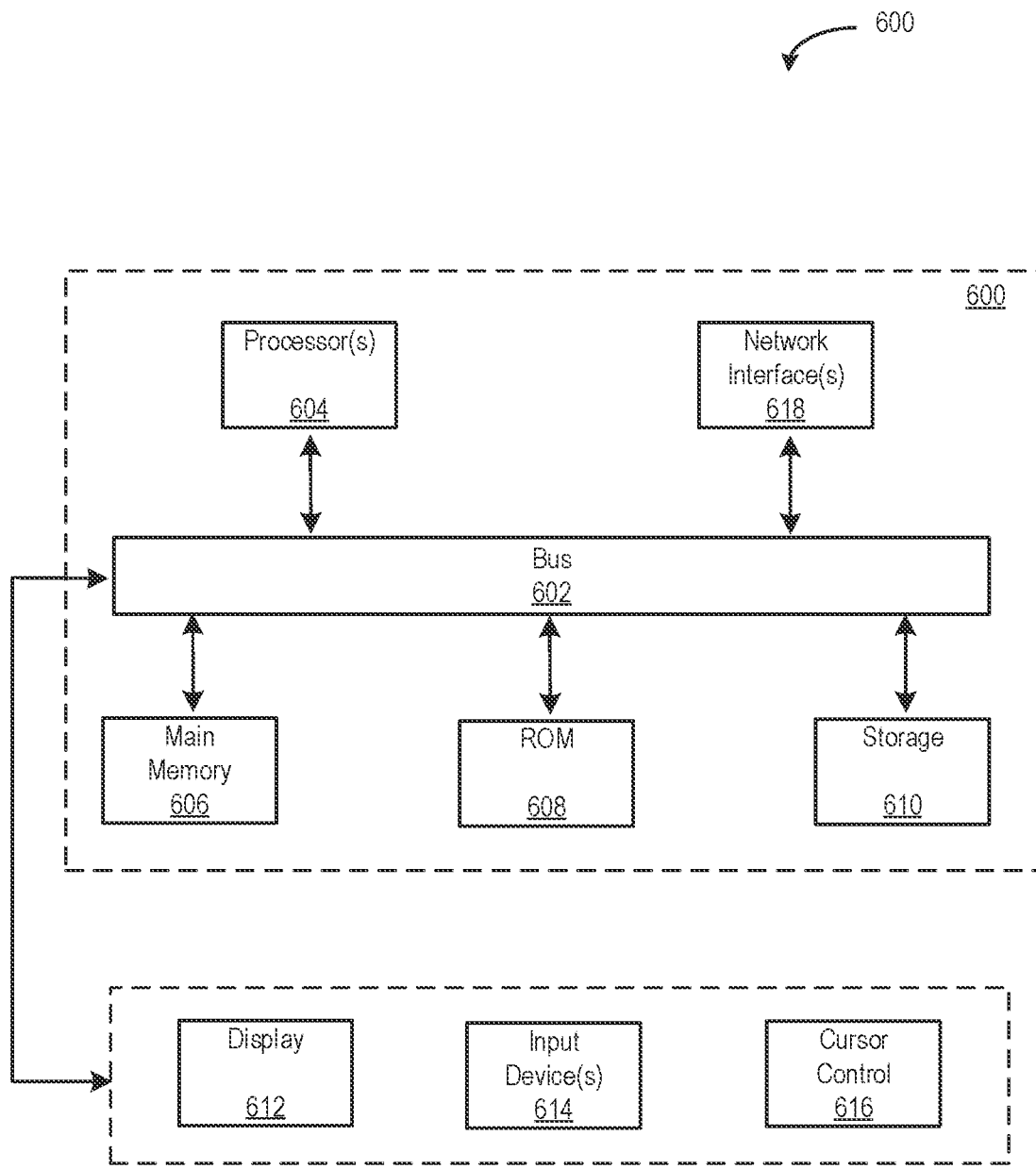
FIG. 6 depicts a block diagram of an example computer system in which the embodiments described herein may be implemented.

FIG. 6 depicts a block diagram of an example computer system 600 in which the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Per, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618. The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process steps may be omitted in some implementations. The methods and processes described herein are also not limited to any particular sequence, and the steps or states relating thereto can be performed in other sequences that are appropriate, or may be performed in parallel, or in some other manner. Steps or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although implementations of present invention have been described in language specific to structural features and/or methods, it is to be noted that the present invention is not necessarily limited to the specific features or methods described. Rather, the specific features and methods are disclosed and explained in the context of a few implementations for the present invention.

We claim:

1. A method comprising:
   detecting, by an Access Point (AP) and based on an unsolicited probe response and Robust Security Network Information Element (RSN IE), occurrence of an attack on the AP;
   responsive to detecting the attack, disabling, by the AP, unsolicited probe responses at the AP; and
   enabling, by the AP, Fast Initial Link Setup (FILS) discovery at the AP.

2. The method of claim 1, wherein detecting occurrence of the attack comprises:
   receiving the unsolicited probe response;
   identifying that a transmitter address of the unsolicited probe response is identical to a transmitter address of the AP;
   detecting a mismatch of security profile information configured in the AP and RSN IE parameters in the unsolicited probe response; and
   identifying occurrence of the attack in the AP, in response detection of the mismatch.

3. The method of claim 1, further comprising detecting occurrence of an attack on a neighbour AP, comprising:
   receiving the unsolicited probe response;
   identifying that a transmitter address of the unsolicited probe response is that of a neighbour AP in an enterprise WLAN;
   detecting that unsolicited probe responses is enabled at the neighbour AP;
   detecting a mismatch of security profile information configured in the neighbour AP and RSN-IE parameters in the unsolicited probe response; and
   identifying occurrence of the attack in the neighbour AP, in response detection of the mismatch.

4. The method of claim 3, wherein detection of the attack at the neighbour AP comprises:
   detecting that FILS discovery is enabled at the neighbour AP; and
   identifying occurrence of the attack in the neighbour AP, in response to receiving the unsolicited probe response.

5. The method of claim 1, wherein the AP is configured to operate in 6 Giga Hertz (GHz) frequency band as per Institute of Electrical and Electronics Engineers (IEEE) 802.11ax-2021 standard.

6. An Access Point (AP) comprising:
   a radio transceiver tuned to operate in the 6 Giga Hertz (GHz) frequency band;
   a processor; and
   a memory coupled to the processor, the memory storing instructions executable by the processor to:
      detect, based on receipt of an unsolicited probe response at the radio transceiver and Robust Security Network Information Element (RSN IE) in the unsolicited probe response, occurrence of an attack on the AP;
      responsive to detecting the attack, disable unsolicited probe responses at the AP; and
      enable Fast initial Link Setup (FILS) discovery at the AP.

7. The AP of claim 6, wherein to detect occurrence of the attack, the processor is to:
   receive an unsolicited probe response;
   identify that a transmitter address of the unsolicited probe response is identical to a transmitter address of the AP;
   detect a mismatch of security profile information configured in the AP and RSN IE parameters in the unsolicited probe response; and
   identify occurrence of the attack in the AP, in response detection of the mismatch.

8. The AP of claim 6, wherein the instructions executable by the processor, further cause the processor to:
   receive an unsolicited probe response;
   identify that a transmitter address of the unsolicited probe response is that of a neighbour AP in an enterprise WLAN;
   detect that unsolicited probe responses are enabled at the neighbour AP;
   detect a mismatch of security profile information configured in the neighbour AP and RSN IE parameters in the unsolicited probe response; and
   identify occurrence of the attack in the neighbour AP, in response detection of the mismatch.

9. The AP of claim 8, wherein the instructions executable by the processor, further cause the processor to:
   detect that FILS discovery is enabled at the neighbour AP; and
   identify occurrence of the attack in the neighbour AP, in response to receiving the unsolicited probe response.

10. The AP of claim 6, wherein the AP is configured as per Institute of Electrical and Electronics Engineers (IEEE) 802.11ax-2021 standard.

11. A method comprising:
    detecting, by a client device based on security profile information received from an Access Point (AP), occurrence of an attack on the AP;
    discarding, by the client device, unsolicited probe responses received from the AP; and
    initiating, by the client device, association with the AP based on a beacon or a solicited probe response from the AP.

12. The method of claim 11, further comprising:
    sending a directed probe request to the AP prior to initiating the association with the AP.

13. The method of claim 11, further comprising:
    validating security profile information of the AP obtained from unsolicited probe responses against security profile information in a beacon or solicited probe response from the AP.

14. The method of claim 11, further comprising:
    delete previous connection history associated with a Service Set Identifier (SSID) and corresponding security profile.

15. The method of claim 11, wherein the detecting the attack comprises:
    identifying multiple failed connection attempts with the AP; and
    checking the Robust Security Network Information Element (RSN IE) in a plurality of unsolicited probe responses; and
    identifying occurrence of the attack, in response to detecting discrepancies in the RSN IE among the plurality of unsolicited probe responses.

16. The method of claim 11, wherein the detecting the attack comprises:

identifying occurrence of the attack in response to receiving both FILS discovery frames and unsolicited probe responses from the AP over a predefined interval.

17. The method of claim 11, wherein the AP is configured to operate in the 6 Giga Hertz (GHz) frequency band as per the Institute of Electrical and Electronics Engineers (IEEE) 802.11ax-2021 standard.

* * * * *